United States Patent
Xiong et al.

(10) Patent No.: US 9,894,718 B1
(45) Date of Patent: Feb. 13, 2018

(54) CONSTANT CURRENT SOURCE LED DRIVER CIRCUIT WITH SELF-CLAMPED OUTPUT

(71) Applicant: Universal Lighting Technologies, Inc., Madison, AL (US)

(72) Inventors: Wei Xiong, Madison, AL (US); Rohan Dayal, Madison, AL (US); Candice Ungacta, Huntsville, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 536 days.

(21) Appl. No.: 14/556,392

(22) Filed: Dec. 1, 2014

Related U.S. Application Data

(60) Provisional application No. 61/916,491, filed on Dec. 16, 2013.

(51) Int. Cl.
| | |
|---|---|
| H05B 37/00 | (2006.01) |
| H05B 39/00 | (2006.01) |
| H05B 41/14 | (2006.01) |
| H05B 33/08 | (2006.01) |
| H05B 37/02 | (2006.01) |

(52) U.S. Cl.
CPC ......... *H05B 33/08* (2013.01); *H05B 33/0815* (2013.01); *H05B 37/02* (2013.01); *H05B 33/0809* (2013.01); *H05B 33/0848* (2013.01); *H05B 33/0851* (2013.01); *Y02B 20/346* (2013.01); *Y02B 20/347* (2013.01); *Y02B 20/348* (2013.01)

(58) Field of Classification Search
CPC ............ H05B 33/0815; H05B 33/0809; H05B 33/0851; H05B 33/0848; H05B 37/02; Y02B 20/346; Y02B 20/348; Y02B 20/347
USPC ...... 315/200 R, 291, 307, 224; 363/126, 17; 307/146; 327/531, 530
See application file for complete search history.

(56) References Cited

U.S. PATENT DOCUMENTS

| | | | |
|---|---|---|---|
| 8,525,428 B2 * | 9/2013 | Chen ..................... | H02M 3/337 315/209 R |
| 2004/0263091 A1 * | 12/2004 | Deurloo ............. | H05B 41/2885 315/246 |

(Continued)

*Primary Examiner* — Alexander H Taningco
*Assistant Examiner* — Christian L Garcia
(74) *Attorney, Agent, or Firm* — Patterson Intellectual Property Law, P.C.; Mark J. Patterson; Gary L. Montle

(57) ABSTRACT

A driver circuit provides current to a light source from a resonant tank having a single inductive element. The driver circuit is coupled to DC power source having a power rail and a ground, and includes a power inverter providing AC input to the tank, which further includes a DC blocking capacitor and a primary winding of the inductive element coupled in series between the output of the inverter and the ground. A leakage inductance of the inductive element provides resonant inductance for the tank. The inductive element further distributes power output from the resonant tank to a plurality of secondary windings coupled to an output rectifier. A resonant capacitor coupled across output ends of the secondary windings provides resonant capacitance for the tank. The output voltages across the secondary windings are clamped to a value based in part on a turns ratio between respective secondary windings.

18 Claims, 5 Drawing Sheets

(56) References Cited

U.S. PATENT DOCUMENTS

2013/0127358 A1* 5/2013 Yao .................... H05B 33/0815
                                                    315/201
2015/0091463 A1* 4/2015 Jin .................... H05B 33/0809
                                                    315/201

* cited by examiner

CONSTANT CURRENT SOURCE LED DRIVER CIRCUIT WITH SELF-CLAMPED OUTPUT

CROSS-REFERENCES TO RELATED APPLICATIONS

This application claims benefit of U.S. Provisional Patent Application No. 61/916,491, dated Dec. 16, 2013, and which is hereby incorporated by reference.

A portion of the invention of this patent document contains material that is subject to copyright protection. The copyright owner has no objection to the reproduction of the patent document or the patent invention, as it appears in the U.S. Patent and Trademark Office patent file or records, but otherwise reserves all copyright rights whatsoever.

BACKGROUND OF THE INVENTION

The present invention relates generally to light source driver circuits. More particularly, the invention relates to current source based driver circuits for LED lighting.

Light emitting diode (LED) lighting is growing in popularity due to decreasing costs and long life compared to incandescent lighting and fluorescent lighting. LED lighting can also be dimmed without impairing the useful life of the LED light source.

Isolated constant current source topologies that are commonly used in light source (e.g., LED) driver circuits include flyback converters, forward converters, LLC converters, and half-bridge isolated buck converters. Flyback converters and forward converters have low efficiency and require the use of high-voltage MOSFET devices. LLC converters have insufficient output voltage range, and the output is not self-limiting. Half-bridge isolated buck converters require hard switching of the MOSFET devices, have low efficiency, require complicated controllers, and the output is not self-limiting.

There is a particular CLASS-2 LED driver defined in Underwriters Laboratories specifications. The specification requires the driver to be isolated and have a maximum output voltage less than 60 volts DC. If a maximum voltage of a load (e.g., a light source such as an LED string) is close to 60 volts, then limiting the output voltage to 60 volts by operation of the control loop in the driver circuit is difficult because control loops inherently have over-shoot and delay.

An LED driver circuit should be capable of driving different loads that have different numbers of LEDs. Thus, the LED driver has to be capable of a wide range of output voltages while maintaining control of the output current. A driver circuit with dimming capability, self-limited output voltage, and a wide output voltage range is thus desirable.

It would further be desirable to simply the circuit topology and accordingly reduce the cost of such an LED driver circuit by reducing the number of magnetic components in the output tank.

BRIEF SUMMARY OF THE INVENTION

An exemplary driver circuit according to the present invention is provided with the aforementioned desired features.

In one embodiment, a driver circuit as disclosed herein is operable to provide current to a light source from a direct current (DC) power source having a power rail and a ground. A power converter includes an input configured to connect to the power rail and the ground of the DC power source, and provides an alternating current (AC) signal at an output. An output tank circuit includes a DC blocking capacitive element and a primary winding of an inductive element coupled in series between the output of the power converter and the ground. The inductive element provides a resonant inductance and further distributes power output from the tank circuit to a plurality of secondary windings of the inductive element. An output rectifier includes respective inputs connected to one or more of the secondary windings of the inductive element and an output operable to connect to the light source.

In one further aspect, the driver circuit further includes a clamping circuit having a first clamping diode having an anode connected to the ground, a second clamping diode having a cathode connected to the power rail of the DC power source and an anode connected to a cathode of the first clamping diode, and another DC blocking capacitor and a secondary winding of the inductive element coupled in series between the ground and the anode of the second clamping diode.

In another exemplary aspect, a resonant inductance of the tank circuit includes a leakage inductance associated with the inductive element, wherein in one embodiment the plurality of secondary windings of the inductive element are tightly coupled with respect to each other, and are loosely coupled with respect to the primary winding of the inductive element to generate the leakage inductance for the tank circuit.

In another exemplary aspect, the capacitive element of the tank circuit may be considered a first capacitive element, and the secondary winding of the inductive element in the clamping circuit may be considered a first secondary winding of the inductive element. A second capacitive element is coupled on a first end to a first end of a second secondary winding of the inductive element, and on a second end to a first end of a third secondary winding of the inductive element. In such an embodiment, the output rectifier has its respective inputs connected to the first and second ends of the second capacitive element. The second capacitive element provides a resonant capacitance for the tank circuit corresponding to a turns ratio between the primary winding and the first secondary winding of the inductive element.

In another exemplary aspect, the first and second clamping diodes are effective to limit a maximum and a minimum peak voltage across the first secondary winding of the inductive element to one-half of a voltage of the power rail of the DC power source. A turns ratio between the respective plurality of secondary windings of the inductive element is selected as a function of a voltage of the power rail of the DC power source and a predetermined output voltage limit.

In another exemplary aspect, an output circuit ground is isolated from the ground of the DC power source. A current sensing resistor has a first terminal connected to the circuit ground and a second terminal operable to connect to the light source, wherein a voltage across the current sensing resistor is proportional to a current through the light source. A controller is connected to the circuit ground and the second terminal of the current sensing resistor to monitor the voltage across the current sensing resistor and sense the current provided to the light source. The controller is operable to adjust a switching frequency of the power converter as a function of the sensed current to maintain the sensed current at a target current.

In another exemplary aspect, the power converter may be a half-bridge inverter having the resonant tank coupled to an output node between first and second switches further coupled in series between the power rail of the DC power source and the ground of the DC power source.

In another exemplary aspect, a gate drive transformer is configured to receive a gate drive signal from the controller, the gate drive signal controlling the switching frequency of the power converter. A gate drive capacitor is connected in series with a primary winding of the gate drive transformer across a gate drive output of the controller. A first gate drive resistor is connected in series with a first secondary winding of the gate drive transformer between a control terminal of the first switch and the output of the power converter. A second gate drive resistor is connected in series with a second secondary winding of the gate drive transformer between a control terminal of the second switch and the ground of the DC power circuit. The polarity of the first secondary winding and the second secondary winding of the gate drive transformer are opposite such that the first switch and second switch are driven out of phase by the gate drive transformer.

In another exemplary aspect, the controller is connected to a dimming circuit and configured to receive a dimming signal from the dimming circuit. The controller is operable to control the current provided to the light source as a function of the received dimming signal by adjusting the target current as a function of the received dimming signal.

DETAILED DESCRIPTION OF THE INVENTION

Figure 1:
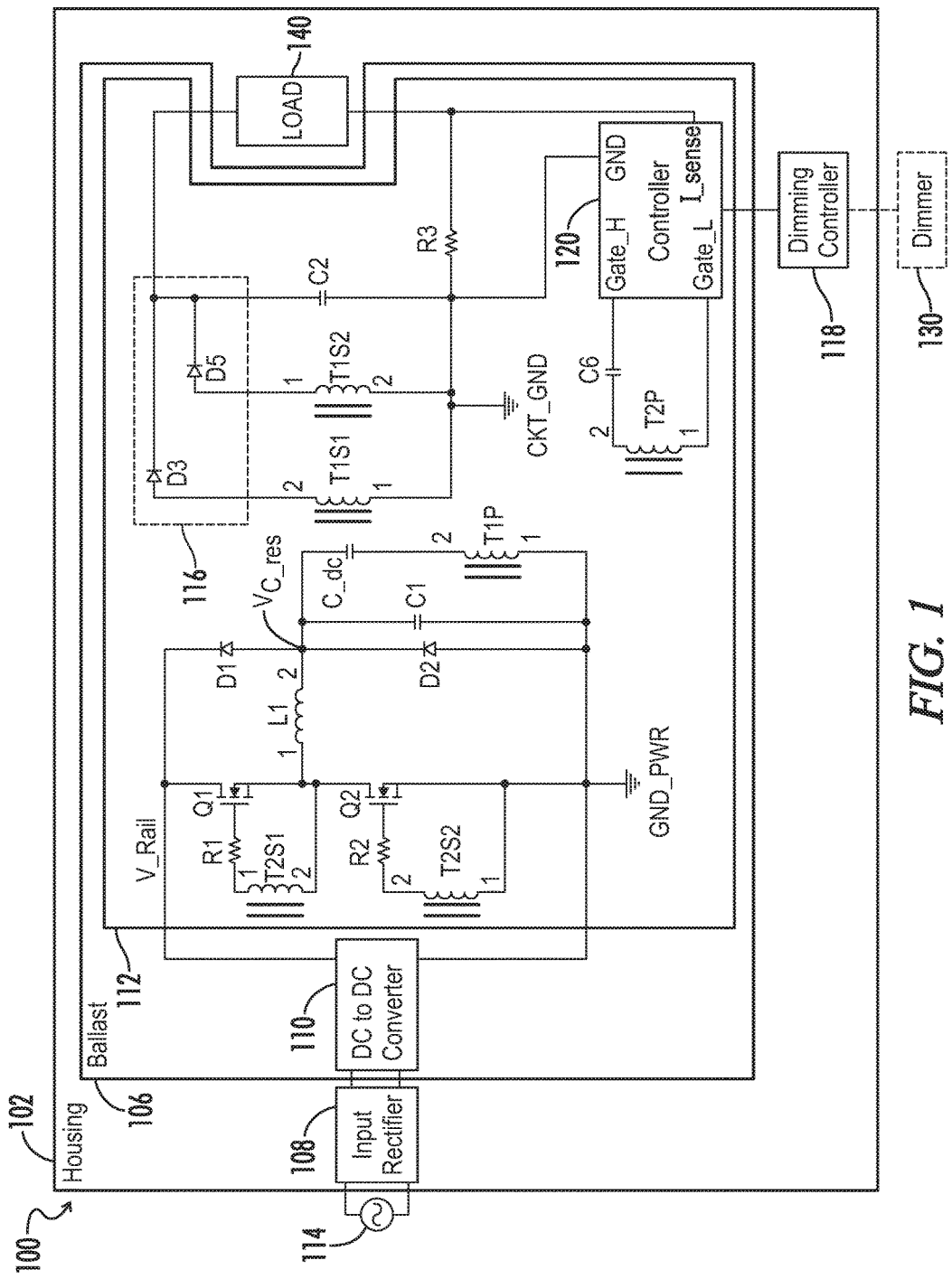
FIG. 1 is a block diagram and partial schematic diagram of a light fixture including one embodiment of a light source and ballast as disclosed herein.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" refers to any circuit for providing power from a power source to a light source. Additionally, "light source" refers to one or more light emitting devices such as fluorescent lamps, high intensity discharge lamps, incandescent bulbs, and solid state light-emitting elements such as LEDs, organic light emitting diodes, and plasmaloids.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Referring generally to FIGS. 1-6, various embodiments of a lighting system and method according to the present invention may be described herein. Where the various figures may describe embodiments sharing various common elements and features with other embodiments, similar elements and features are given the same reference numerals and redundant description thereof may be omitted below.

Referring to FIG. 1, a light fixture 100 includes a housing 102, a ballast 106, and a load or light source 140. The light fixture 100 receives power from an alternating current (AC) power source 114 and provides light from the light source 140. The light source 140 provides light in response to receiving current. The housing 102 is connected to the ballast 106 and the light source 140. In one embodiment, the housing 102 supports the ballast 106 and the light source 140 in a predetermined spatial relationship. In one embodiment, the light source 140 is a plurality of series and parallel connected light emitting diodes. In one embodiment, the light fixture 100 also includes a dimming circuit operable to provide a dimming signal to a controller 120 of the ballast 106. The dimming signal is indicative of a target current or light intensity level for the light source 140.

The ballast 106 is operable to provide current to the light source 140 from the AC power source 114. The ballast 106 includes an input rectifier 108 and a driver circuit 112. The input rectifier 108 is operable to connect to the AC power source 114 and provide a DC power source having a power rail V_RAIL and a ground GND_PWR at an output of the input rectifier 108. In one embodiment, the ballast 106 also includes a DC-to-DC converter 110 connected between the input rectifier 108 and the driver circuit 112. The DC-to-DC converter 110 is operable to alter a voltage of a power rail V_RAIL of a DC power source provided by the input rectifier 108. The driver circuit 112 is operable to provide current to the light source 140 from the DC power source provided by the input rectifier 108.

The driver circuit 112 includes a half-bridge inverter, a resonant tank circuit, an isolating transformer, an output rectifier 116, and a controller 120. The driver circuit 112 provides a self-limiting output voltage, has relatively high efficiency, is capable of dimmed operation, and has a wide output voltage operating range. The driver circuit 112 operates as a constant current source with a self-limiting output voltage. The driver circuit 112 is optionally dimmable such that the constant current can be changed. The half-bridge inverter includes a first switch Q1 (i.e., a high side switch) and a second switch Q2 (i.e., a low side switch) and has an input and an output. The input of the half-bridge inverter is operable to connect to the power rail V_RAIL and the ground GND_PWR of the DC power source and provide an AC signal at the output of the half-bridge inverter. In one embodiment, the input of the half-bridge inverter is a high side of the high side switch, and a low side of the low side switch (e.g., second switch Q2) is operable to connect to the ground of the DC power source.

The resonant tank circuit includes a resonant inductor L1, a resonant capacitor C1, a first clamping diode D1, and a second clamping diode D2. The resonant tank circuit has an input and an output. The input of the resonant tank circuit (e.g., a first terminal of a resonant inductor L1) is connected to the output of the half-bridge inverter. The resonant capacitor C1 is connected in series with the resonant inductor L1 between the output of the half-bridge inverter and the ground GND_PWR of the DC power source. The first clamping diode D1 has an anode connected to a junction formed at the connection between the resonant inductor L1 and a resonant capacitor C1. The cathode of the first clamping diode D1 is connected to the power rail V_RAIL of the DC power source. The second clamping diode D2 has an anode connected to the ground GND_PWR of the DC power source and a cathode connected to the junction between the resonant capacitor C1 and the resonant inductor L1. In one embodiment, the resonant tank circuit includes a DC blocking capacitor C_DC connected between the junction of the resonant inductor L1 and resonant capacitor C1 and the output of the resonant tank circuit. The first clamping diode D1 and the second clamping diode D2 cooperate to limit the voltage at the junction between the resonant inductor L1 and a resonant capacitor C1 to a maximum voltage equal to the voltage of the power rail V_RAIL of the DC power source and a minimum voltage equal to the ground GND_PWR of the DC power source.

An isolating transformer is connected to the output of the resonant tank circuit. The isolating transformer includes a primary winding T1P and a secondary winding T1S1, T1S2. The primary winding T1P is connected between the output of the resonant tank circuit and the ground GND_PWR of the DC power source. The output rectifier 116 has an input connected to the secondary winding T1S1, T1S2 of the isolating transformer and an output operable to connect to the light source 140. In one embodiment, the turns ratio of the isolating transformer is selected as a function of a voltage of the power rail V_RAIL of the DC power source and a predetermined output voltage limit. In one embodiment, the output voltage limit is 60 VDC.

The controller 120 is operable to sense current provided to the light source 140 from the output rectifier 116 and to adjust a switching frequency of the half-bridge inverter as a function of the sensed current to maintain the sensed current at a target current. In one embodiment, the target current is determined as a function of the dimming signal provided by the dimming controller 118. The controller 120 is further operable to control the current provided to the light source 140 as a function of the received dimming signal by adjusting the target current as a function of the received dimming signal. In one embodiment, the controller 120 adjusts the current provided to the light source 140 by adjusting a switching frequency of the half-bridge inverter.

In one embodiment, the secondary winding T1S1, T1S2 of the isolating transformer is connected to a circuit ground CKT_GND which is isolated from the ground GND_PWR of the DC power source by the isolating transformer. Specifically, the secondary winding includes first secondary winding T1S1 and second secondary winding T1S2, each connected to the circuit ground CKT_GND. The first secondary winding T1S1 and the second secondary winding T1S2 are connected out of phase with one another.

The output rectifier includes a first output diode D3 and a second output diode D5. The first output diode D3 has its anode connected to the first secondary winding T1S1 and a cathode coupled to the light source 140 (i.e., an output of the driver circuit 112 and ballast 106). The second output diode D5 has an anode connected to the second secondary winding T1S2 and a cathode coupled to the light source 140 (i.e., the output of the driver circuit 112 and ballast 106).

In one embodiment, an output capacitor C2 is connected between the output of the output rectifier 116 and the circuit ground CKT_GND to smooth or stabilize the output voltage of the driver circuit 112 and ballast 106. In one embodiment, a current sensing resistor R3 is connected between the circuit ground CKT_GND and the light source 140. A first terminal of the current sensing resistor R3 is connected to the circuit ground CKT_GND, and a second terminal of the current sensing resistor is operable to connect to the light source 140. Thus, a voltage across the current sensing resistor is proportional to a current through the light source 140. The controller 120 is connected to the circuit ground CKT_GND and the second terminal of the current sensing resistor R3 to monitor the voltage across the current sensing resistor and sense the current provided to the light source 140 by the ballast 106.

In one embodiment, the driver circuit 112 further includes a gate drive transformer. The gate drive transformer is operable to receive the gate drive signal from the controller 120 which controls the switching frequency of the half-bridge inverter. The gate drive transformer includes a primary winding T2P a first secondary winding T2S1, and a second secondary winding T2S2. In this embodiment, the first switch Q1 and the second switch Q2 of the half-bridge inverter each have a high terminal, a low terminal, and a control terminal. The high terminal of the first switch Q1 is connected to the power rail V_RAIL of the DC power source. The low terminal of the second switch Q2 is connected to the ground GND_PWR of the DC power source. The high terminal of the second switch Q2 is connected to the low terminal of the first switch Q1. A gate drive capacitor C6 is connected in series with the primary winding T2P of the gate drive transformer across a gate drive output (i.e., gate_H and gate_L) of the controller 120. A first gate drive resistor R1 is connected in series with the first secondary winding T2S1 of the gate drive transformer between the control terminal of the first switch Q1 and the output of the half-bridge inverter. A second gate drive resistor R2 is connected in series with the second secondary winding T2S2 of the gate drive transformer between the control terminal of the second switch Q2 and the ground GND_PWR of the DC power circuit. The polarity of the first secondary winding T2S1 and the second secondary winding T2S2 of the gate drive transformer are opposites such that the first switch Q1 and the second switch Q2 are driven out of phase by the gate drive transformer.

Figure 2:
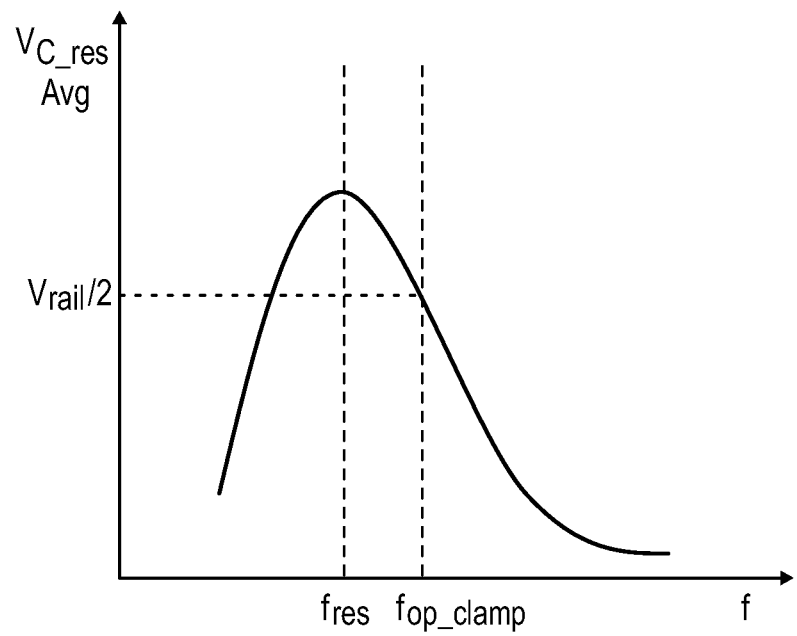
FIG. 2 is a graphical plot of average voltage of the resonant capacitor versus frequency of the half-bridge inverter for a driver circuit topology that does not include clamping diodes.

Referring to FIG. 2, a plot of average resonant capacitor voltage $V_{C\_res}$ versus frequency is shown for a driver circuit topology that does not include the first clamping diode D1 and the second clamping diode D2. Because the voltage $V_{C\_res}$ of the resonant capacitor C1 is not clamped or limited, the voltage $V_{C\_res}$ of the resonant capacitor C1 can be much greater than one-half the voltage of the power rail V_RAIL of the DC power source.

In contrast, in the driver circuit 112 which includes the first clamping diode D1 and the second clamping diode D2, the average voltage $V_{C\_res}$ of the resonant capacitor C1 is clamped at one-half the voltage of the power rail V_RAIL (i.e., V_RAIL/2 in FIG. 3), regardless of the operating (i.e., switching) frequency of the half-bridge inverter because the instantaneous voltage of the resonant capacitor is clamped at the voltage of the power rail V_RAIL. The maximum frequency at which the first clamping diode D1 and the second clamping diode D2 limit the voltage of the resonant capacitor C1 is the clamping frequency $f_{op\_clamp}$. Above the clamping frequency $f_{op\_clamp}$, the average voltage of the resonant capacitor C1 is less than V_RAIL/2.

Thus, when the operating frequency (i.e., switching frequency) of the half-bridge inverter is less than the clamping frequency $f_{op\_clamp}$, the voltage $V_{C\_res}$ of the resonant capacitor C1 is still limited to one-half the voltage of the power rail V_RAIL. Thus, even when the switching frequency is at the resonant frequency $f_{res}$ of the resonant tank, the average voltage $V_{C\_res}$ across the resonant capacitor C1 will be limited to one-half the voltage of the power rail V_RAIL, but reducing the frequency below the clamping frequency $f_{op\_clamp}$ (e.g., to the resonant frequency $f_{res}$ of the resonant tank circuit) can provide more current to the primary winding T1S1 of the isolating transformer. The driver circuit 112 can thus provide additional current to the light source 140 without increasing the output voltage of the driver circuit 112 by decreasing the operating frequency of the half-bridge inverter.

Figure 3:
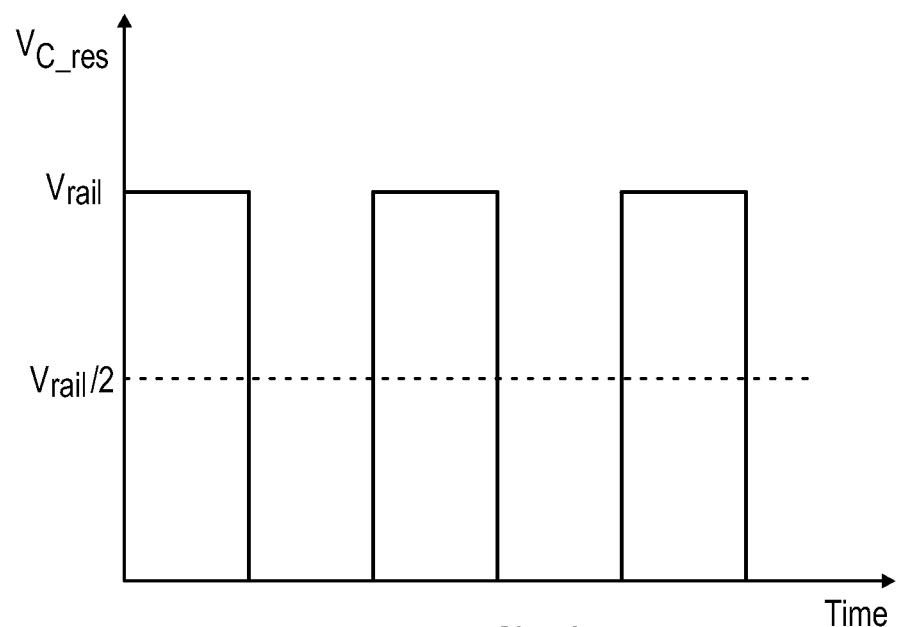
FIG. 3 is a plot of voltage of the resonant capacitor versus time for a switching frequency of the half-bridge inverter that is less than the resonant frequency of the resonant tank circuit.
Figure 4:
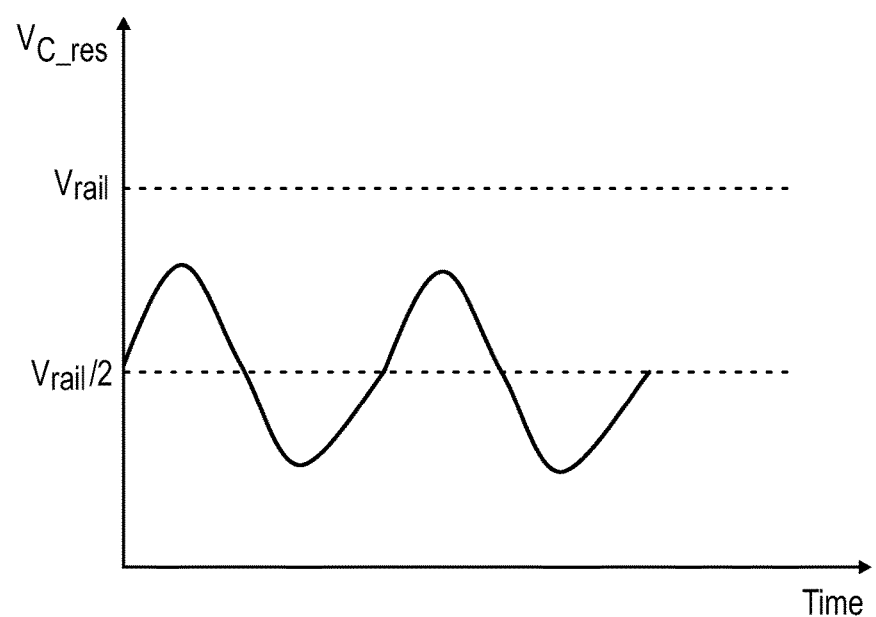
FIG. 4 is a plot of voltage of the resonant capacitor versus time for a switching frequency of the half-bridge inverter that is greater than the resonant frequency of the resonant tank circuit.

Referring to FIG. 3, the voltage waveform for the resonant capacitor C1 is shown for an operating frequency that is less than the resonant frequency $f_{res}$ of the resonant tank circuit. Referring to FIG. 4, the voltage waveform for the resonant capacitor C1 is shown for an operating frequency that is greater than the resonant frequency $f_{res}$ of the resonant tank circuit.

Because the maximum voltage across the resonant capacitor C1 is clamped, the maximum peak voltage across the isolating transformer primary winding T1S1 is also clamped. Thus, if the turns ratio N of the isolating transformer is selected such that $$N = \frac{V\_RAIL}{2} * \frac{1}{60},$$

then the secondary winding voltage of the isolating transformer will never exceed 60 Volts (i.e., the UL Class-2 limit). The half-bridge inverter and the resonant tank circuit is thus a voltage source with a self-clamped output voltage.

Further, because the voltage $V_{C\_res}$ across the resonant capacitor C1 is limited to V_RAIL/2, the half-bridge inverter that drives the resonant tank circuit will always operate in a soft-switching condition. This reduces the switching losses and increases the efficiency of the driver circuit 112.

Referring again to FIG. 2, the voltage $V_{C\_res}$ across the resonant capacitor C1 can vary between V_RAIL/2 and 0 volts. The driver circuit 112 can thus drive any light source 140 (e.g., any LED configuration) from the predetermined maximum output voltage (e.g., 60 volts) to the minimum voltage (i.e., 0 volts).

In one embodiment, the driver circuit 112 includes a series resonant inverter that has a self-limited output voltage. The series resonant inverter exhibits half-bridge soft-switching under all operating conditions. The driver circuit 112 operates as a constant current source that has a self-limited output voltage. The driver circuit 112 operates as a constant current source that has a wide output voltage operating range. The driver circuit 112 can be controlled by an external reference signal (i.e., a dimming signal from a dimmer 130 interfacing with the dimming controller 118) to provide a dimming function.

Figure 5:
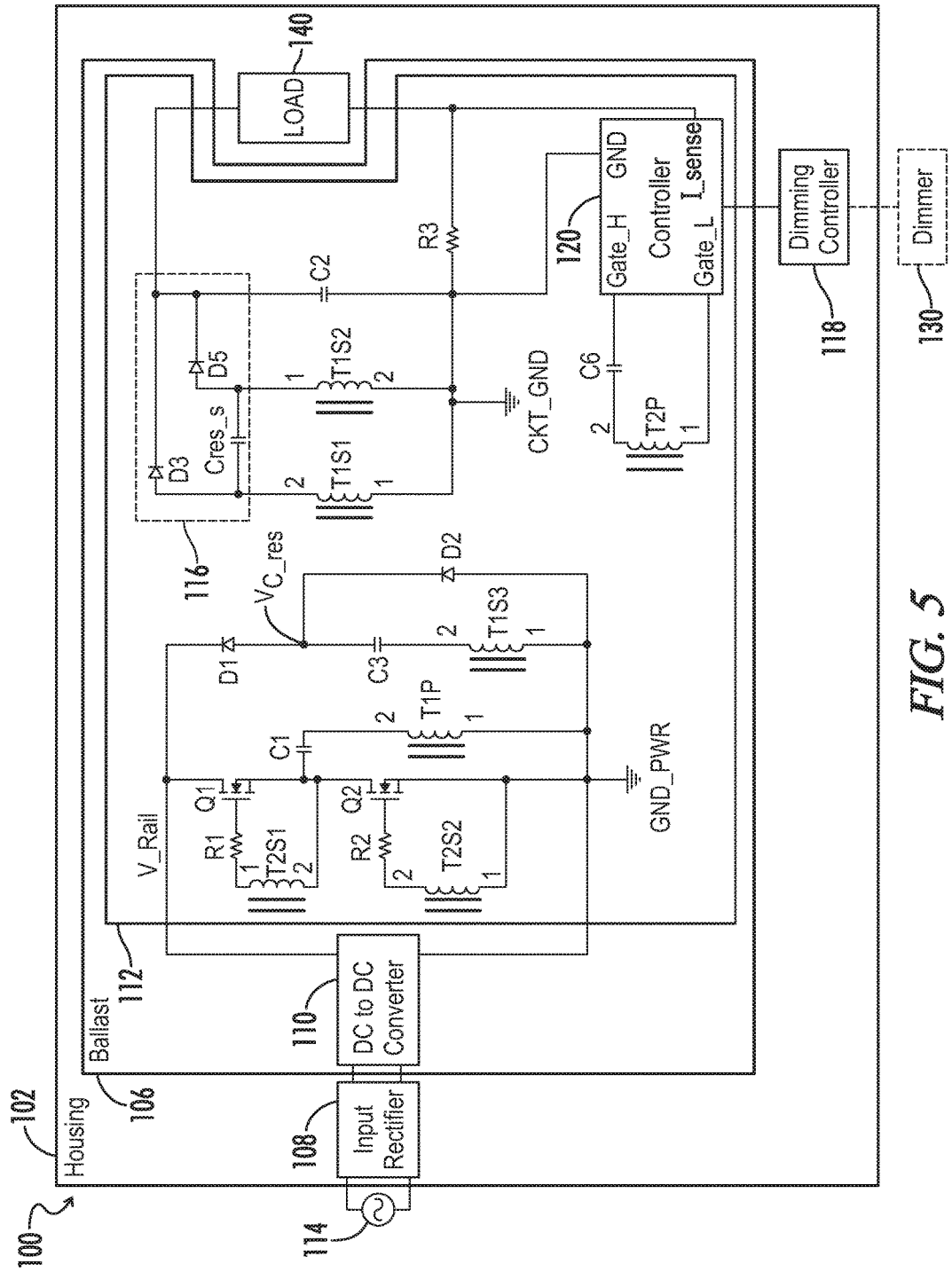
FIG. 5 is a block diagram and partial schematic diagram of a light fixture including another embodiment of a light source and ballast as disclosed herein.
Figure 6:
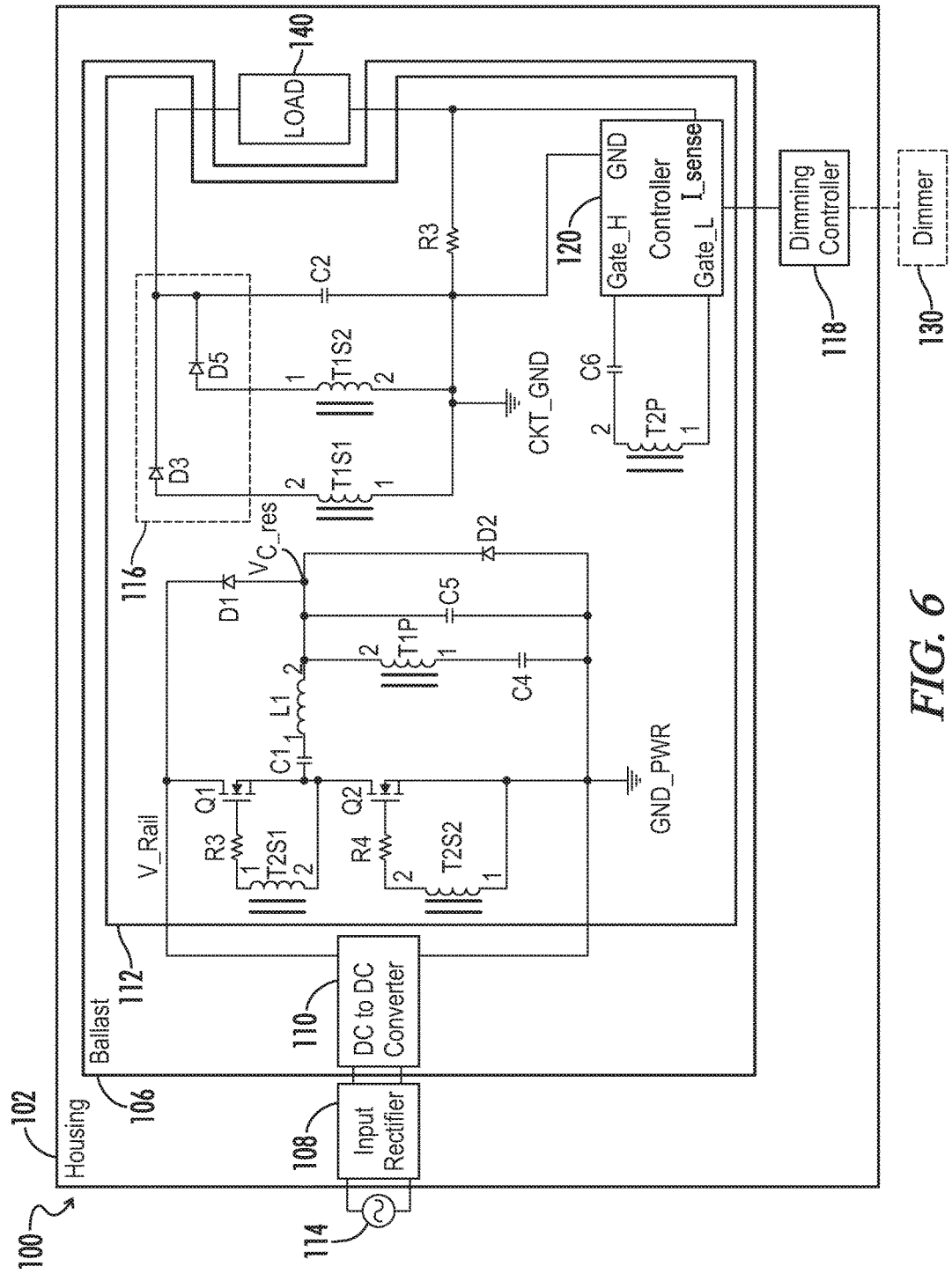
FIG. 6 is a block diagram and partial schematic diagram of an equivalent circuit with respect to the topology represented in FIG. 5.

Referring now to FIGS. 5 and 6, embodiments of a driver circuit 112 as disclosed herein substantially simplify the previously disclosed arrangement by, for example, eliminating the resonant inductor and integrating it into the output transformer. By combining the two magnetic components in the output tank of an embodiment as represented in FIG. 1 and described above, the cost of the product may correspondingly be reduced.

Referring more particularly to an alternative embodiment as shown in FIG. 5, the output power tank is configured such that there is only one output transformer T1. The primary winding of T1 is T1_p. Three secondary windings of T1 are T1_s1, T1_s2 and T1_s3. Windings T1_s1, T1_s2 and T1_s3 may be designed to be tightly coupled in practice, whereas the primary winding T1_p and each of the secondary windings may preferable be designed to be loosely coupled so as to provide a sufficient leakage inductance on the primary side of the circuit.

As represented in the circuit of FIG. 5, winding T1_s3 is connected in series with a DC blocking capacitor C3. A clamping circuit including diodes D1 and D2 is used to clamp the voltage across the winding T1_S3. Because diode D2 is connected in parallel with C3 and T1_s3, the voltage across C3 will be the peak of the voltage across T1_s3. Diode D1 is used to clamp the total voltage across C3 and T1_s3 to V_RAIL. As a result of the clamping function provided by diodes D1 and D2, the maximum and minimum peak voltage across the winding T1_s3 may be clamped at V_RAIL/2. If the turns ratio between windings T1_p and T1_s3 is N2:1, the equivalent capacitance reflected back on the primary side would be: $C3\_eq=C3/(N2)^2$.

Windings T1_s1 and T1_s2 may typically be designed to have an equal number of turns. If the turns ratio between the respective secondary windings T1_s1, T1_s2 and T1_s3 is 1:1:N1, then the voltage across windings T1_s1 and T1_s2 will be clamped at: V_RAIL/(2N), as well as the output voltage across the load 140.

Referring now to the output stage of the circuit in FIG. 5, a capacitor Cres_s is connected across windings T1_s1 and T1_s2. This capacitor is performing substantially the same function as the resonant capacitor C1 previously described and with respect to the circuit represented in FIG. 1. If the turns ratio between primary winding T1_p and secondary windings T1_s1 and T1_s2 are N:1, then the equivalent capacitance reflected back to the primary winding would be $Cres\_s\_eq=C\_res\_s/(N/2)^2$.

An equivalent but simplified topology for the circuit shown in FIG. 5 is further represented in FIG. 6. As shown in FIG. 6, capacitors C3_eq and Cres_s_eq are the equivalent capacitors of capacitors C3 and Cres_s reflected back on the primary side of the circuit. Inductor L1 is representative of the leakage inductance of the primary, which functions as the resonant inductor (L1 as shown in FIG. 1) for the output tank.

Comparing the circuits in FIG. 6 and FIG. 1, one of skill in the art may appreciate that they are electrically substantially identical with the primary exception of the magnetic component count. As a result, an embodiment of the circuit as shown in FIG. 5 may have substantially the same function as an embodiment of the circuit as shown in FIG. 1, but with one less magnetic component and correspondingly lower cost.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A driver circuit operable to provide current to a light source from a direct current (DC) power source having a power rail and a ground, the driver circuit comprising:
    a power converter having an input and an output, wherein the input is configured to connect to the power rail and to the ground of the DC power source and provide an alternating current (AC) signal at the output;
    an output tank circuit comprising a first capacitive element and a primary winding of an inductive element coupled in series between the output of the power converter and the ground;
    wherein the inductive element provides a resonant inductance and is further configured to distribute power output from the tank circuit to at least first, second and third secondary windings of the inductive element;
    a clamping circuit comprising
        a first clamping diode having an anode connected to the ground,
        a second clamping diode having a cathode connected to the power rail of the DC power source and an anode connected to a cathode of the first clamping diode, and
        a DC blocking capacitor and the first secondary winding of the inductive element coupled in series between the ground and the anode of the second clamping diode;
    an output rectifier having first and second inputs connected respectively to the second and third secondary windings of the inductive element and an output operable to connect to the light source; and
    a second capacitive element coupled on a first end to a node between the second secondary winding and the first rectifier input, and on a second end to a node between the third secondary winding and the second rectifier input,
    wherein the second capacitive element provides a resonant capacitance for the tank circuit corresponding to a turns ratio between the primary winding and the first secondary winding of the inductive element.

2. The driver circuit of claim 1, wherein a resonant inductance of the tank circuit comprises a leakage inductance associated with the inductive element.

3. The driver circuit of claim 2, wherein the plurality of secondary windings of the inductive element are tightly coupled with respect to each other, and are loosely coupled with respect to the primary winding of the inductive element to generate the leakage inductance for the tank circuit.

4. The driver circuit of claim 1, wherein:
    the first and second clamping diodes are effective to limit a maximum and a minimum peak voltage across the first secondary winding of the inductive element to one-half of a voltage of the power rail of the DC power source; and
    a turns ratio between the respective plurality of secondary windings of the inductive element is selected as a function of a voltage of the power rail of the DC power source and a predetermined output voltage limit.

5. The driver circuit of claim 1, further comprising:
    an output circuit ground, wherein the output circuit ground is isolated from the ground of the DC power source;
    a current sensing resistor having a first terminal connected to the circuit ground and a second terminal operable to connect to the light source, wherein a voltage across the current sensing resistor is proportional to a current through the light source; and
    a controller connected to the circuit ground and the second terminal of the current sensing resistor to monitor the voltage across the current sensing resistor and sense the current provided to the light source, the controller configured to adjust a switching frequency of the power converter as a function of the sensed current to maintain the sensed current at a target current.

6. The driver circuit of claim 5, the power converter comprising a half-bridge inverter having
    a first switch having a high terminal, a low terminal, and a control terminal, wherein the high terminal is connected to the power rail of the DC power source, and a second switch having a high terminal, a low terminal, and a control terminal, wherein the low terminal is connected to the ground of the DC power source, the high terminal of the second switch is connected to the low terminal of the first switch; and the driver circuit further comprises a gate drive transformer configured to receive a gate drive signal from the controller, the gate drive signal controlling the switching frequency of the half-bridge inverter, the gate drive transformer comprising a primary winding, a first secondary winding, and a second secondary winding, a gate drive capacitor connected in series with the primary winding of the gate drive transformer across a gate drive output of the controller, a first gate drive resistor connected in series with the first secondary winding of the gate drive transformer between the control terminal of the first switch and the output of the half-bridge inverter, a second gate drive resistor connected in series with the second secondary winding of the gate drive transformer between the control terminal of the second switch and the ground of the DC power circuit, and wherein the polarity of the first secondary winding and the second secondary winding of the gate drive transformer are opposite such that the first switch and second switch are driven out of phase by the gate drive transformer.

7. The driver circuit of claim 5, wherein:
the controller is connected to a dimming circuit and configured to receive a dimming signal from the dimming circuit; and
wherein the controller is configured to control the current provided to the light source as a function of the received dimming signal by adjusting the target current as a function of the received dimming signal.

8. A light fixture comprising:
a light source operable to provide light in response to receiving current;
a ballast configured to provide current to the light source from an alternating current (AC) power source, the ballast comprising:
 an input rectifier configured to connect to the AC power source and provide a direct current (DC) power source having a power rail and a ground at an output of the input rectifier;
 a power converter having an input and an output, wherein the input is configured to connect to the power rail and the ground of the DC power source and provide an alternating current (AC) signal at the output;
 a tank circuit comprising a first capacitive element and a primary winding of an inductive element coupled in series between the output of the power converter and the ground;
 the inductive element providing a resonant inductance and further configured to distribute power output from the resonant tank circuit to at least first, second and third secondary windings of the inductive element;
a clamping circuit comprising
 a first clamping diode having an anode connected to the ground,
 a second clamping diode having a cathode connected to the power rail of the DC power source and an anode connected to a cathode of the first clamping diode, and a DC blocking capacitor and the first secondary winding of the inductive element coupled in series between the ground and the anode of the second clamping diode;
an output rectifier having first and second inputs connected respectively to the second and third secondary windings of the inductive element and an output operable to connect to the light source;
a second capacitive element coupled on a first end to a node between the second secondary winding and the first rectifier input, and on a second end to a node between the third secondary winding and the second rectifier input, wherein the second capacitive element provides a resonant capacitance for the tank circuit corresponding to a turns ratio between the primary winding and the first secondary winding of the inductive element; and
a controller configured to sense current provided to the light source from the output rectifier and adjust a switching frequency of the power converter as a function of the sensed current to maintain the sensed current at a target current.

9. The light fixture of claim 8, wherein a resonant inductance of the tank circuit comprises a leakage inductance associated with the inductive element.

10. The light fixture of claim 9, wherein the plurality of secondary windings of the inductive element are tightly coupled with respect to each other, and are loosely coupled with respect to the primary winding of the inductive element to generate the leakage inductance for the tank circuit.

11. The light fixture of claim 8, wherein:
the first and second clamping diodes are effective to limit a maximum and a minimum peak voltage across the first secondary winding of the inductive element to one-half of a voltage of the power rail of the DC power source; and
a turns ratio between the respective secondary windings of the inductive element is selected as a function of a voltage of the power rail of the DC power source and a predetermined output voltage limit.

12. The light fixture of claim 8, further comprising:
an output circuit ground, wherein the output circuit ground is isolated from the ground of the DC power source;
a current sensing resistor having a first terminal connected to the circuit ground and a second terminal operable to connect to the light source, wherein a voltage across the current sensing resistor is proportional to a current through the light source; and
the controller connected to the circuit ground and the second terminal of the current sensing resistor to monitor the voltage across the current sensing resistor and sense the current provided to the light source.

13. The light fixture of claim 12, the power converter comprising a half-bridge inverter having:
a first switch having a high terminal, a low terminal, and a control terminal, wherein the high terminal is connected to the power rail of the DC power source, and
a second switch having a high terminal, a low terminal, and a control terminal, wherein the low terminal is connected to the ground of the DC power source,
the high terminal of the second switch is connected to the low terminal of the first switch; and
the light fixture further comprises
a gate drive transformer configured to receive a gate drive signal from the controller, the gate drive signal controlling the switching frequency of the half-bridge inverter, the gate drive transformer comprising a primary winding, a first secondary winding, and a second secondary winding, a gate drive capacitor connected in series with the primary winding of the gate drive transformer across a gate drive output of the controller, a first gate drive resistor connected in series with the first secondary winding of the gate drive transformer between the control terminal of the first switch and the output of the half-bridge inverter, a second gate drive resistor connected in series with the second secondary winding of the gate drive transformer between the control terminal of the second switch and the ground of the DC power circuit, and wherein the polarity of the first secondary winding and the second secondary winding of the gate drive transformer are opposite such that the first switch and second switch are driven out of phase by the gate drive transformer.

14. The light fixture of claim 12, wherein:

the controller is connected to a dimming circuit and configured to receive a dimming signal from the dimming circuit; and wherein the controller is configured to control the current provided to the light source as a function of the received dimming signal by adjusting the target current as a function of the received dimming signal.

15. A driver circuit operable to provide current to a light source from a direct current (DC) power source having a power rail and a ground, the driver circuit comprising:

first and second switching elements coupled in series across the power rail and the ground of the DC power source;

a tank circuit comprising a first capacitive element and a primary winding of an inductive element connected in series on a first end to a node between the first and second switching elements and on a second end to the ground;

first and second clamping diodes connected in series between the power rail and the ground;

a DC blocking capacitor and a first secondary winding of the inductive element coupled in series between the ground and a node between the first and second clamping diodes; and an output stage comprising a second capacitive element coupled on a first end to a second secondary winding and on a second end to a third secondary winding, wherein the second capacitive element provides a resonant capacitance for the tank circuit corresponding to a turns ratio between the primary winding and the first secondary winding of the inductive element.

16. The driver circuit of claim 15, wherein a resonant inductance of the tank circuit comprises a leakage inductance associated with the inductive element.

17. The driver circuit of claim 16, wherein the plurality of secondary windings of the inductive element are tightly coupled with respect to each other, and are loosely coupled with respect to the primary winding of the inductive element to generate the leakage inductance for the tank circuit.

18. The driver circuit of claim 15, wherein:

the first and second clamping diodes are effective to limit a maximum and a minimum peak voltage across the first secondary winding of the inductive element to one-half of a voltage of the power rail of the DC power source; and a turns ratio between the respective plurality of secondary windings of the inductive element is selected as a function of a voltage of the power rail of the DC power source and a predetermined output voltage limit.

\* \* \* \* \*